United States Patent [19]

Blackwood

[11] Patent Number: 4,635,474

[45] Date of Patent: Jan. 13, 1987

[54] METHOD AND APPARATUS FOR WIND DIRECTION AND SPEED IN SPATIAL DETERMINATION BY MAGNUS EFFECT

[75] Inventor: Carl I. R. Blackwood, Fort Washington, Md.

[73] Assignee: White Scientific Consultants Inc., Arlington, Va.

[21] Appl. No.: 703,550

[22] Filed: Feb. 20, 1985

[51] Int. Cl.⁴ .............................................. G01W 1/04
[52] U.S. Cl. .................................... 73/189; 73/861.42
[58] Field of Search ............ 73/180, 188, 189, 861.36, 73/861.37, 861.42, 861.71

[56] References Cited

U.S. PATENT DOCUMENTS

| | | | |
|---|---|---|---|
| 2,078,837 | 4/1937 | Carter | 73/861.53 X |
| 2,660,886 | 12/1953 | Milmore | 73/861.46 X |
| 2,896,450 | 7/1959 | Mason | 73/861.36 |
| 3,223,846 | 12/1965 | Rochester | 73/188 X |

Primary Examiner—Charles A. Ruehl
Attorney, Agent, or Firm—Wilkinson, Mawhinney & Theibault

[57] ABSTRACT

A smooth cylinder is rotated about its vertically mounted axis with alternative provision for a horizontally mounted sphere affixed to its top. The superposition of the circulatory air flow thus created around the cylinder, and the fluid stream vector, results in a definitive and measurable lift via the Magnus effect. The orthogonal force thus generated totally identifies the horizontal component of the spatial fluid vector; and its vertical component can be determined from a similar effect on the sphere. The sensitivity of the device can be enhanced by increasing the rotation rate; and may be further augmented by employing a second similar device with its rotation in the opposite sense to that of the first. By this expedient, it is also possible to reduce the system to a purely deterministic system by the cancellation of the effects of drag and platform motion. In addition, the device is intrinsically resilient to the otherwise detrimental effects of rainfall, temperature and pressure variations. Its sensitivity can be critically controlled to meet the particular operating circumstance—thus making it eminently suitable for applications in turbulent and fast changing wind conditions.

16 Claims, 27 Drawing Figures

ACTUAL VECTOR OUTPUT IS: $\sqrt{Sy^2 + Sx^2} \,/\, Tan^{-1} Sy/Sx$

NB: THIS IS TWICE THE DESIRED MAGNUS VECTOR

METHOD AND APPARATUS FOR WIND DIRECTION AND SPEED IN SPATIAL DETERMINATION BY MAGNUS EFFECT

BACKGROUND OF THE INVENTION

Wind measurement devices (anemometers) have a long history, and their principles of operation can be generally ascribed to two notable physical factors. The first underlying principle for wind measurement depends on the accurate observation of heat flow in a moving air stream; and the second depends on observing and measuring pressure differentials. More recently, direct methods aimed at measuring the ion flow associated with atmospheric currents have been introduced: these are, however, costly, cumbersome and non-trivial in their operation.

There are, nevertheless, grave shortcomings in traditional systems as far as accuracies in the measurements of the magnitude and directional properties of the wind vector are concerned over a wide dynamic operational range. Invariably, system resilience is compromised by the inherently non-linear behavior of the physical principles concerned when subject to large velocity variations. Then there is the question of the effect of moisture on many traditional measuring systems; and their sensitivities to changing temperatures and pressures.

The system being proposed here depends for its operation on the Magnus effect in which induced mechanical energy creates a circulatory flow which then interacts with the wind vector to produce a precise, reliable and measurable lift. The device's sensitivity may be enhanced or reduced by increasing or decreasing the circulatory flow in an easily controlled manner. It is, in addition, impervious to the vagaries of moisture or temperature variations; and would only be minimally affected by very significant pressure changes.

SUMMARY OF THE INVENTION

The present invention depends for its operation on the Magnus effect as first observed by the German physicist Gustav Magnus in 1852. Briefly stated, the Magnus effect is that orthogonal force acting on a symmetrical object rotationg about its axis of symmetry when that object is subject to wind currents. In the device described herein, a cylinder is rotated about its vertically mounted axis with a horizontally mounted rotating sphere affixed to the top of the cylinder. The force acting on the cylinder so as to move it along the horizontal plane is that Magnus force caused by the interaction of the horizontal component of the wind vector and the circular vector due to the spinning cylinder. The "tendency" of the cylinder to move will not only give the magnitude of the wind speed component, but also the direction in which it acts. This tendency is measured by observing the tilt of the cylinder about a pneumatically damped universal pivot. The vertical component of the wind vector is determined by measuring the changes in pressure on the mount positions of the rotating sphere caused by the spinning motion about its own axis.

In consideration of the very probable "noise" in the received signals as a consequence of the platform motion and "bluff-body" effects, the following additional facility is incorporated. Adjacent the arrangement described above is a second similar arrangement with its cylinder subject to an equivalent rotation in the opposite sense to that of the first cylinder. The sphere affixed to the top of this second cylinder is spun about its axis in the same sense as that of the first sphere. Because both cylinders spin in opposite directions, the Magnus force experienced by both as a result of a given wind current will be equal and opposite. The extraneous effects of the platform's motion, however, will be the same on both cylinders. Thus, when the resultant vector of the second cylinder (derived from measuring the cylinder tilt) is subtracted from the resultant vector of the first cylinder, the spurious noises cancel, and the actual desired wind signal will be doubled. A similar doubling of the sensitivity of the vertical vector component is derived by simply adding the signals from both spinning spheres.

Measurement of the cylinder tilt symptomatic of the tendency to move due to the Magnus force is achieved by observing the sweep of a narrow beam of light, directed through the vertical column to which the cylinder is mounted. The recovery of the signal from the spinning sphere mounted in the rotating cylinder is a more difficult undertaking, and is accomplished either by the use of slip rings or by a very low power. The sphere can also be mounted separately from the cylinder.

THEORETICAL VERIFICATION

When the motion of a fluid relative to a body in the fluid medium is such that (i) the Mach number is much less than unity;
(ii) the Froude and Reynolds numbers are greater than unity; and
(iii) there is no heat transfer between the fluid and the body;

then for all practical purposes, the fluid so concerned may be sensibly regarded as an incompressible fluid.

I begin from the basis that a cylinder of radius 'a' placed in a uniform stream $\overline{U}$ generates a disturbance field which is represented by a doublet whose axis opposes the stream and whose strengh $(\eta)$ is given by $\eta = 2\pi U a^2$. The stream function at any field point $P(r,\theta)$ (FIG. 1) due to the combined flow is then given by $$\psi_s(r,\theta) = U\left(1 - \frac{a^2}{r^2}\right) r \sin\theta$$

and the velocity components are found from $$u_r^{(s)}(r,\theta) = \frac{1}{r} \frac{\partial \psi_s}{\partial \theta} = U\left(1 - \frac{a^2}{r^2}\right) \cos\theta$$

$$u_\theta^{(s)}(r,\theta) = -\frac{\partial \psi_s}{\partial r} = -U\left(1 + \frac{a^2}{r^2}\right) \sin\theta$$

The pressure distribution over the cylinder is given in terms of the pressure coefficient $(C_p^{(s)})$ at any point on the cylinder by $$C_p^{(s)}(a,\theta) = 1 \frac{V^2(a,\theta)}{U^2}$$

On the cylinder, $r=a$, thus $u_r^{(s)}=0$ and $u_\theta^{(s)} = -2U\sin\theta$. Therefore $V^2 = 4U^2\sin^2\theta$ and, hence, $C_p^{(s)}$ becomes $$C_p^{(s)}(a,\theta) = 1 - 4\sin^2\theta$$

which reveals a symmetrical distribution about the X and Y axes, thereby resulting in zero force on the cylinder. In practice, experimental results agree well with the theory in the vicinity of the forward stagnation point; but discrepancies arise at the rear of the cylinder due to the "bluff body" nature of the cylinder and the drag it experiences.

The severity of these discrepancies is dependent on the Reynolds number (R) where $$R = \frac{\rho U d}{\mu}$$

$\rho$ is the density of the fluid stream in its undisturbed state; $\mu$ is its coefficient of viscosity; and d is the diameter of the cylinder. Experiment shows that these discrepancies became less severe at higher Reynolds numbers (Karamcheti, 1966). Thus far, no circulatory motion around the cylinder has been considered; and although we have assumed the fluid to be incompressible, it is not ideal since it has not been assumed to be inviscid.

In considering the superposition of a uniform stream $\vec{U}$ past a cylinder of radius "a" and a circulatory flow around the cylinder, the sense of the circulatory flow is clockwise and has a designated value of $\Gamma$ (FIG. 2).

The stream function for the flow field due to the motion of the uniform stream $\vec{U}$ only, has already been given as $\psi_s$ where $$\psi_s(r,\theta) = U\left(1 - \frac{a^2}{r^2}\right) r \sin\theta$$

The stream function for the circulatory flow around the cylinder is given by $\psi_c$ where $$\psi_c(r,\theta) = \frac{\Gamma}{2\pi} \log\left(\frac{r}{a}\right)$$

The stream function for the combined flow is given by $\psi$ where $$\psi(r,\theta) = \psi_s(r,\theta) + \psi_c(r,\theta)$$

$$= U\left(1 - \frac{a^2}{r^2}\right) r \sin\theta + \frac{\Gamma}{2\pi} \log\left(\frac{r}{a}\right)$$

The velocity components of the flow are determined by $u_r(r,\theta)$ and $u_\theta(r,\theta)$ where $$u_r(r,\theta) = \frac{1}{r} \frac{\partial \psi}{\partial \theta} = U\left(1 - \frac{a^2}{r^2}\right) \cos\theta$$

$$u_\theta(r,\theta) = -\frac{\partial \psi}{\partial r} = -U\left(1 + \frac{a^2}{r^2}\right) \sin\theta - \frac{\Gamma}{2\pi} \frac{1}{r}$$

At the stagnation points, $u_r = u_\theta = 0$. They are, therefore, given by the equations $$\left(1 - \frac{a^2}{r^2}\right) \cos\theta = 0$$

$$U\left(1 + \frac{a^2}{r^2}\right) \sin\theta = -\frac{\Gamma}{2\pi} \frac{1}{r}$$

from which the following results are deduced.

(a) If $\Gamma = 0$, there are two stagnation points with the cylindrical coordinates $(a,\pi)$ and $(a,0)$. (See FIG. 3(a)).

(b) If $\Gamma \neq 0$, then the stagnation points are located such that $\sin\theta < 0$, that is, $\pi \leq \theta \leq 2\pi$.

When $u_r = 0$, one obvious solution is $r = a$; and when $r = a$, $$\theta = \sin^{-1}\left(\frac{-\Gamma}{4\pi U a}\right).$$

This is easily verified from $u_\theta = 0$. An examination of $u_r = u_\theta = 0$ shows that one solution exists for which $r > a$. This solution will not be considered here (see Karamcheti, 1966). A look at the solution $$\theta = \sin^{-1}\left(\frac{-\Gamma}{4\pi U a}\right)$$

demonstrates that for a real solution $\Gamma \leq 4\pi U a$.

Thus, if $\Gamma < 4\pi U a$, there are two stagnation points on the surface of the cylinder below the X-axis as shown in FIG. 3(b); and for $\Gamma = 4\pi U a$, both stagnation points coincide at $\theta = 3\pi/2$ as evidenced in FIG. 3(c). FIG. 3(d) shows the condition for $\Gamma > 4\pi U a$. It is, therefore, clear that the location of the stagnation points on the cylinder depends crucially on the value of the circulation; and that they move downward as the circulation increases. The flow field, which is symmetrical with respect to both the X and Y axes when the circulation is zero, becomes increasingly asymmetrical with respect to the X-axis as the value of the circulation increases; but retains its symmetry with respect to the Y-axis. This would suggest the existence of a non-zero force in the positive-Y direction; but a zero force anywhere along the X-axis.

The circulatory flow around the cylinder can be generated by rotating the cylinder in the fluid stream; and experiment demonstrates a remarkable agreement with the theoretically determined streamlines. The pressure distribution over the cylinder is given by the Bernoulli equation (Kramacheti, 1966)

$$p(a,\theta) = H - \tfrac{1}{2}\rho V^2(a,\theta)$$

for steady irrotational fluid motion. H is a constant for all points of the fluid and is independent of both time and space. At the surface of the cylinder $u_r = 0$, hence $$V^2(a,\theta) = u_\theta^2(a,\theta) = 4U^2 \sin^2\theta + \frac{\Gamma^2}{4\pi^2} \frac{1}{a^2} + \frac{2U\Gamma}{\pi a} \sin\theta$$

Substituting the above expression for V $(a,\theta)$ into the Bernoulli equation gives:

$$P(a,\theta) = H - 2\rho U^2 \sin^2\theta - \frac{\rho \Gamma^2}{8\pi^2 a^2} - \frac{\rho U \Gamma}{\pi a} \sin\theta$$

A study of the above expression for $p(a,\theta)$ over the ranges $0 \leq \theta \leq \pi$ and $\pi \leq \theta \leq 2\pi$ shows it to be symmetrical about the Y-axis, but asymmetrical about the X-axis. The values of pressure for the range $\pi \leq \theta \leq 2\pi$ will in general be higher than their corresponding conjugate values in the range $0 \leq \theta \leq \pi$. This means that the cylinder experiences a definite non-zero force in the positive Y direction for $0 < \Gamma \leq 4\pi Ua$ but experiences no force anywhere in the X direction. As has already been noted, however, the cylinder will experience some drag in practice. The lift "L" per unit length of the cylinder is obtained by integrating the Y components of pressure over a unit length of the cylinder. Hence, $$L = - \int_0^{2\pi} p \sin\theta a \, d\theta = \frac{\rho}{2} a \int_0^{2\pi} u_\theta^2(a,\theta) \sin\theta d\theta$$

From the above integral, we get $L = \rho U \Gamma$.

This result is significant in that it reveals a definitive and measurable quantity for the lift experienced by a rotating cylinder in a moving fluid stream. It further indicates that this lift so generated acts at right angles to the direction of the moving fluid steam; and bears a simple relationship to the speed at which the stream moves. This lifting force—experienced when the circulatory flow around a rotating cylinder is superposed with a flowing fluid stream—is referred to as the Magnus effect. It is evident from the foregoing statements and derivations that this force vector can be used to determine the direction of a fluid stream.

FIG. 4 summarizes the principle of the Magnus force as observed when a symmetrical rotating body encounters an air current. In the figure, the cylinder (side elevation) rotates in a clockwise direction, and in doing so, causes to exist a thin rotating air film (i.e., a circulatory flow) very close to the surface of the cylinder. This air film has the same rotational sense as the cylinder. As is evidenced in FIG. 4, a high pressure area develops where the rotational sense of the air film runs counter to the wind vector; and conversely, a low pressure area develops where they have the same directional sense. The cylinder is, therefore, constrained to move away from the high pressure region towards the low pressure region. Motion is such as to be perpendicular to the direction of the wind vector. This Magnus force is not inconsiderable and has been used to propel ships.

BRIEF DESCRIPTION OF THE FIGURE OF DRAWINGS

FIGS. 3(a) through 3(d) are plan view schematic views of fluid flow superposed with circulatory flow under four different conditions.

Figure 1:
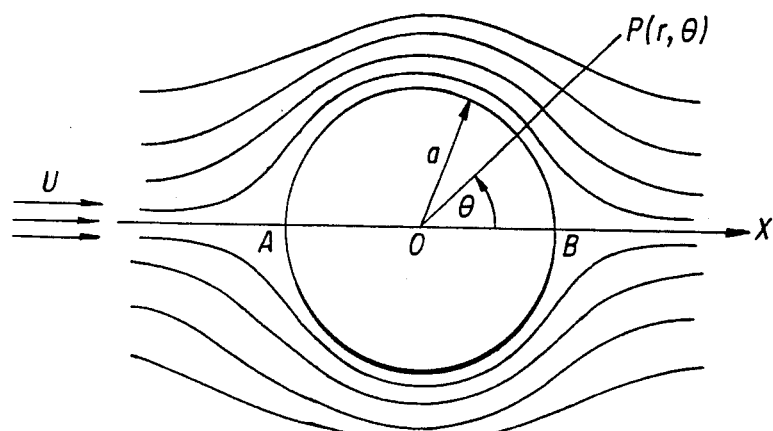
FIG. 1 is a schematic view of the flow path about a circular cylinder.
Figure 2:
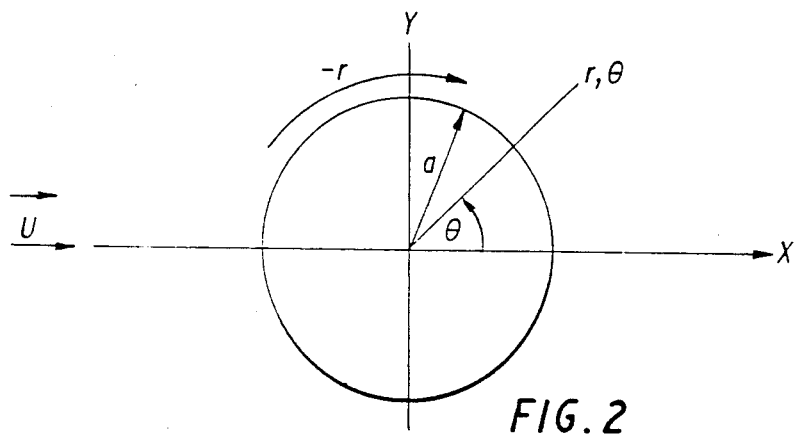
FIG. 2 is a schematic view of the circulatory flow around a cylinder in plan view.
Figure 4:
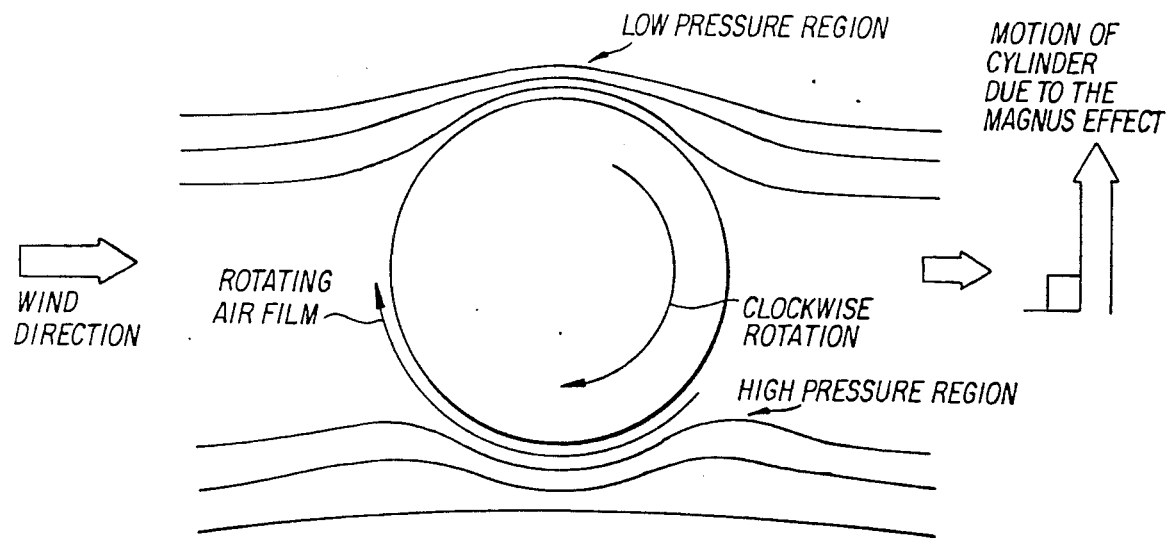
Figure 3A:
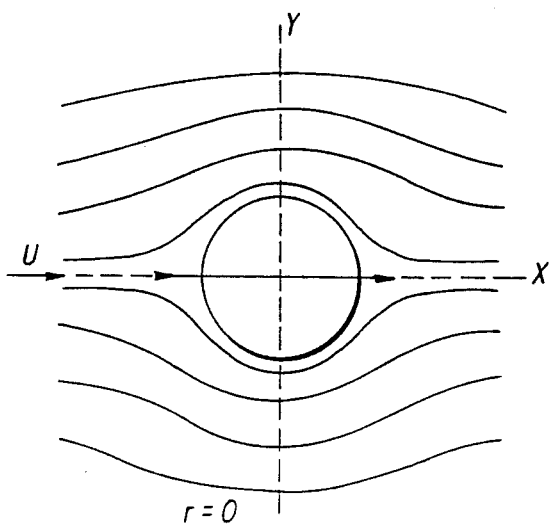
Figure 3B:
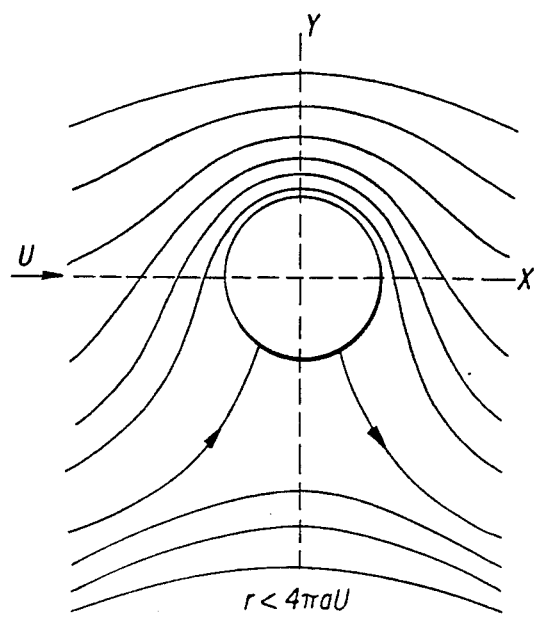
Figure 3C:
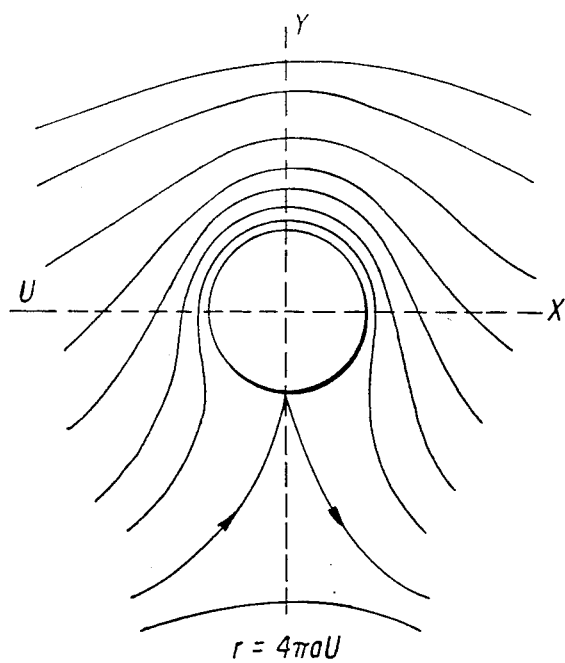
Figure 3D:
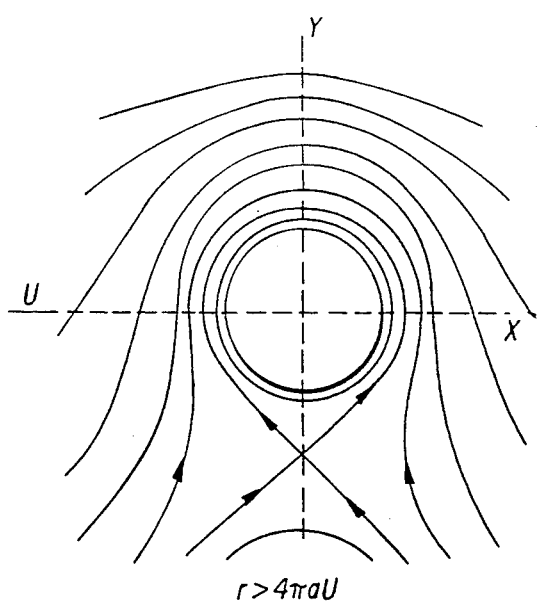

FIG. 4 is a plan view schematic demonstrating the Magnus effect.

Figure 5:
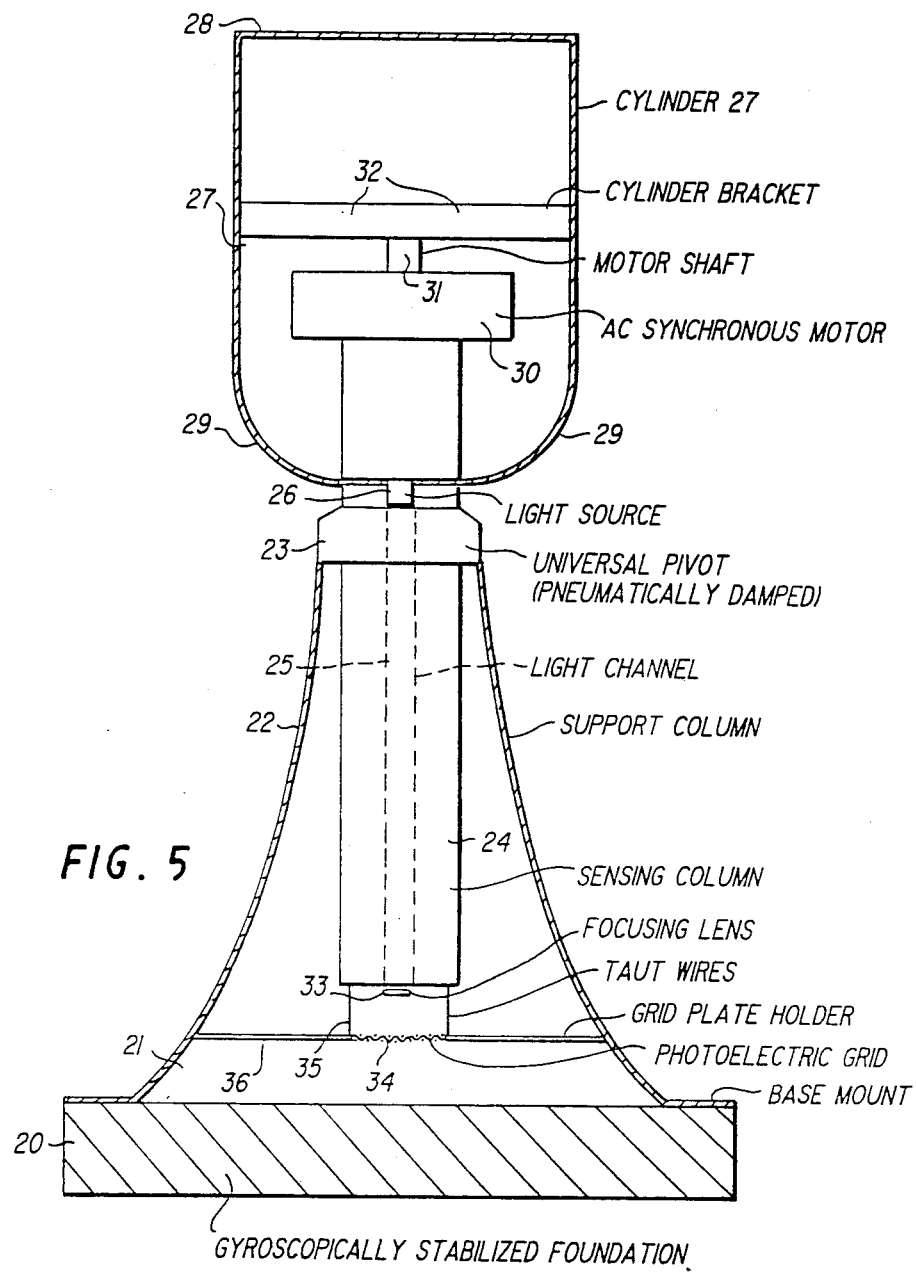

FIG. 5 is a vertical sectional view of a schematic form of a Magnus vane apparatus constructed in accordance with the present invention.

FIG. 5A is a schematic showing taut wires and strain gauges between the sensing column and grid plate holder.

Figure 6:
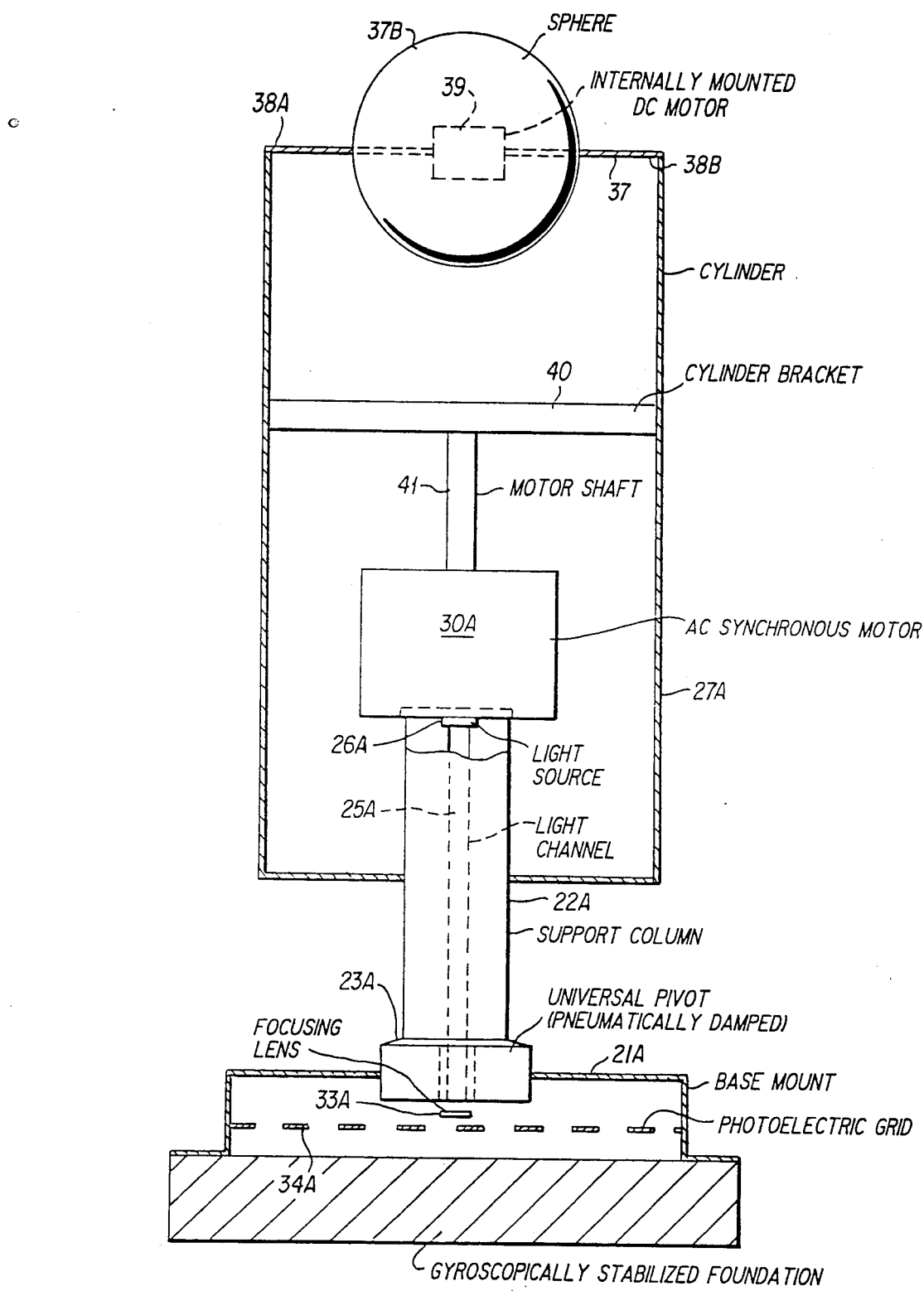

FIG. 6 is a similar view through a modified form of composite magnus vane and sphere constructed in accordance with the present invention.

Figure 7:
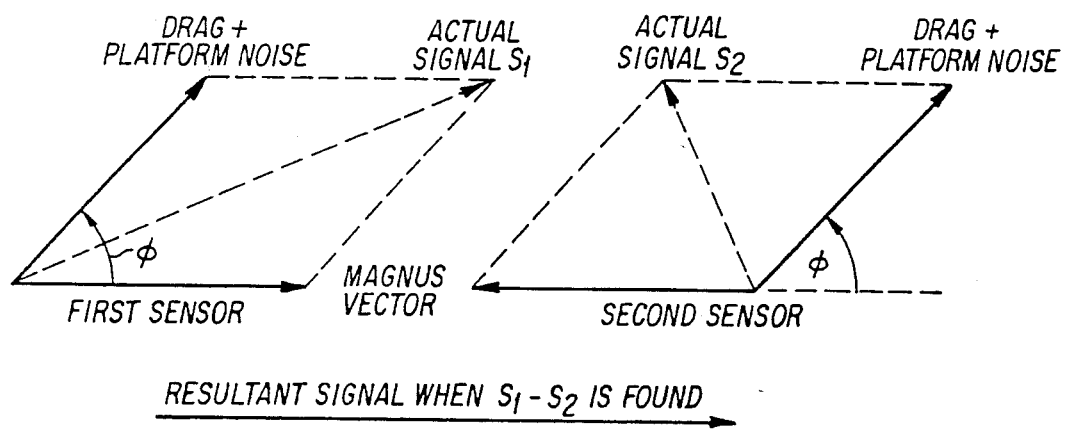

FIG. 7 is a vectoral diagram of the deterministic reduction for the removal of drag effect and platform noise of the apparatus of the present invention.

Figure 8:
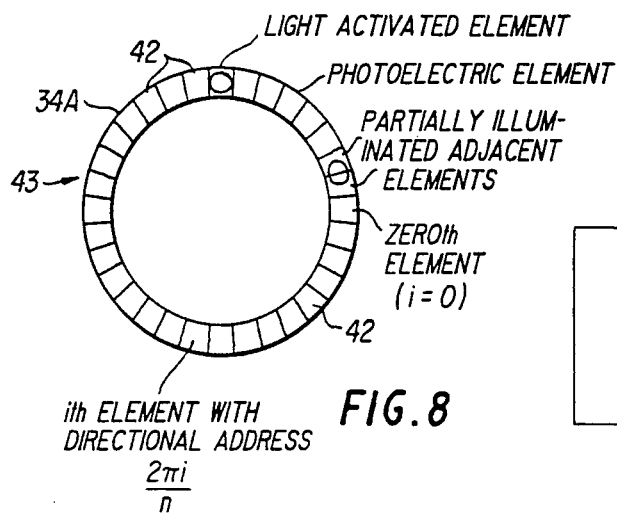

FIG. 8 is a top plan schematic of a photoelectric ring having n elements, each element having a unique address employed for determining Magnus vane deviation in accordance with the present invention.

Figure 9:
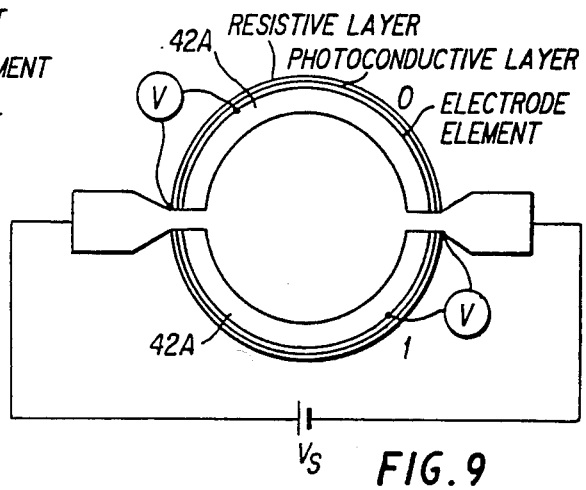

FIG. 9 is a top plan schematic of an optical potentiometer having three bonded layers of resistive, photoconducting and electrode elements.

Figure 10A:
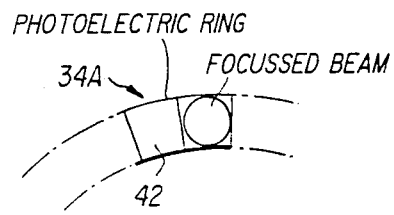
Figure 10B:
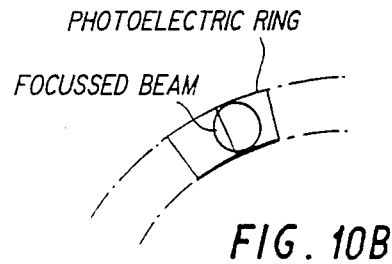

FIGS. 10a through 10b are plan schematic views of application of the photoelectric ring of FIG. 8 wherein the light sensing beam lies wholly within a single cell in one condition and the light beam partially illuminates adjacent cells in a second condition.

Figure 11A:
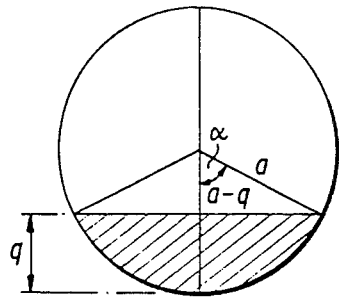
Figure 11B:
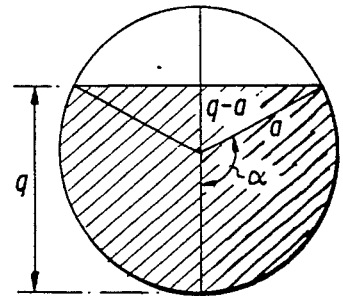

FIGS. 11a and 11b are magnified schematics of two adjacent elements i and i+1 with the illuminated area within the i th element equal to A; and that within the (i+1) th element equal to b.A.

Figure 12A:
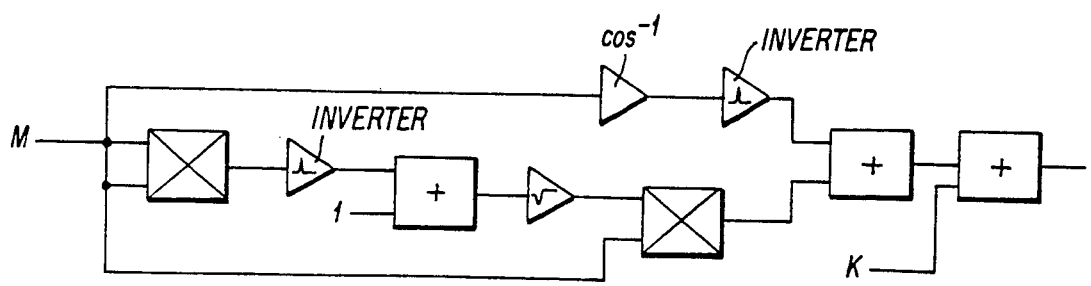

FIG. 12a is a schematic of an analog circuit that defines the address of the focussed light beam on the photoelectric ring FIG. 8.

Figure 12B:
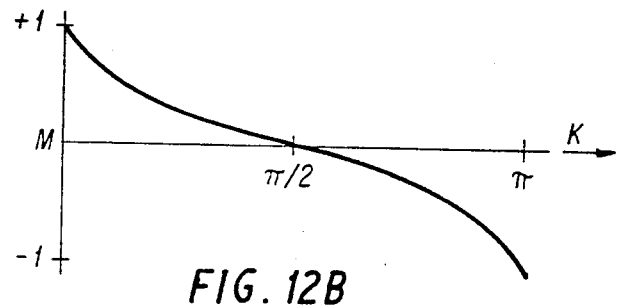

FIG. 12b demonstrates the odd mathematical property of the system equation when the ordinate axis is transposed to $\pi/2$ on the abscissa.

Figure 13:
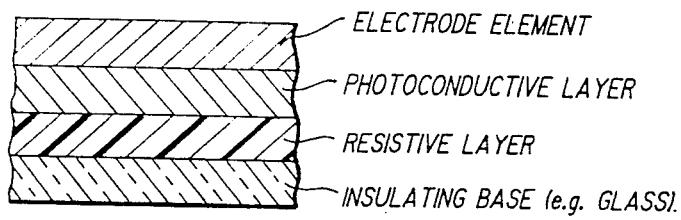

FIG. 13 is a magnified vertical cross-section through the optical potentiometer.

Figure 14:
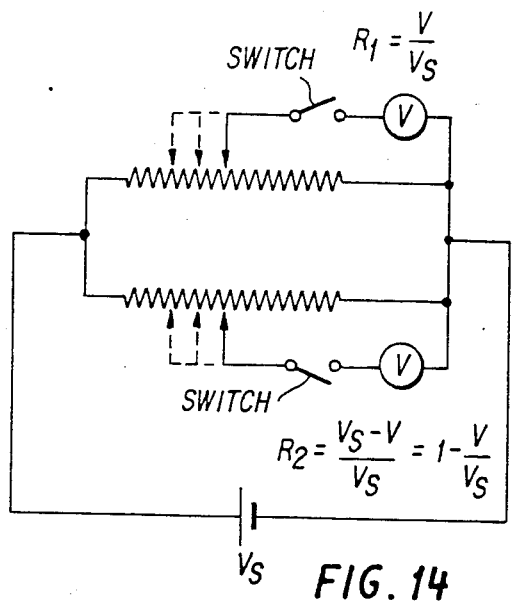

FIG. 14 is an electrical schematic of the optical potentiometer.

Figure 15:
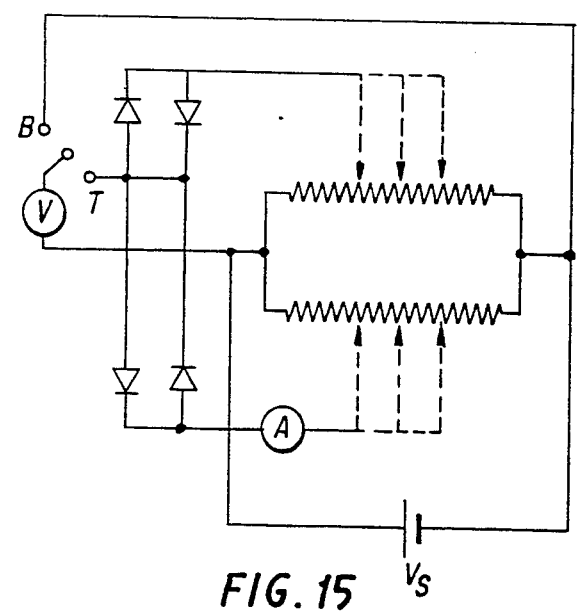

FIG. 15 is a modified schematic of FIG. 14.

Figure 16:
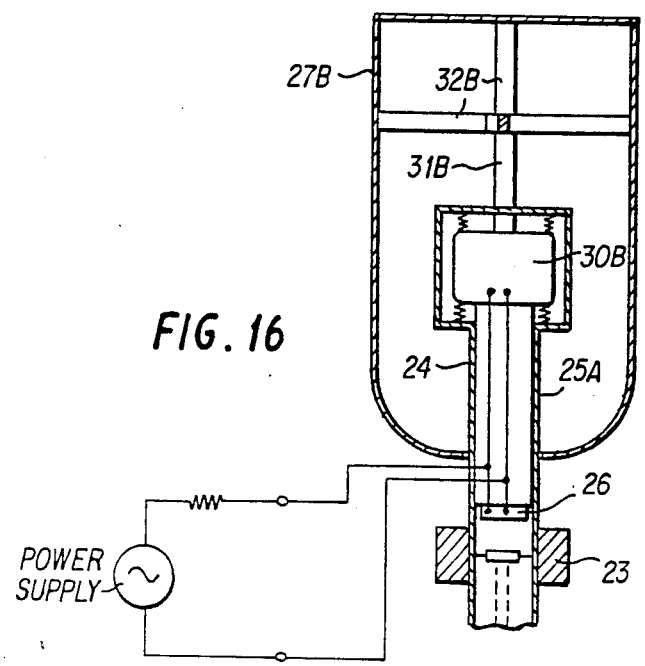

FIG. 16 is a schematic view through the form of apparatus shown in FIG. 5 showing the electrical drive and light source energy for the apparatus.

Figure 17:
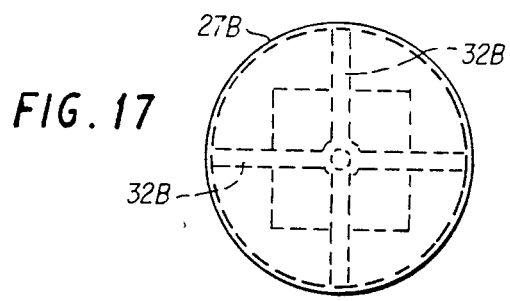

FIG. 17 is a top plan view of the apparatus of FIG. 16.

Figure 18:
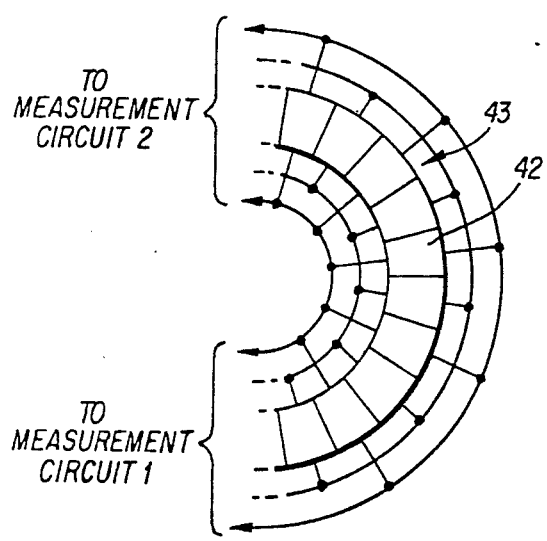

FIG. 18 is a schematic top plan view of the photoelectric ring of FIG. 9 showing circuit connections between adjacent segments.

Figure 19:
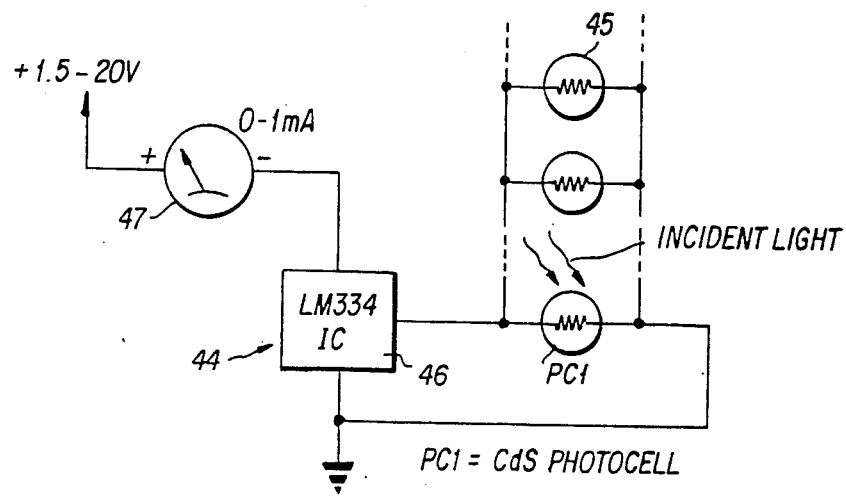

FIG. 19 is a schematic view of the integrated circuit employed with each circuit connection of FIG. 18.

Figure 20:
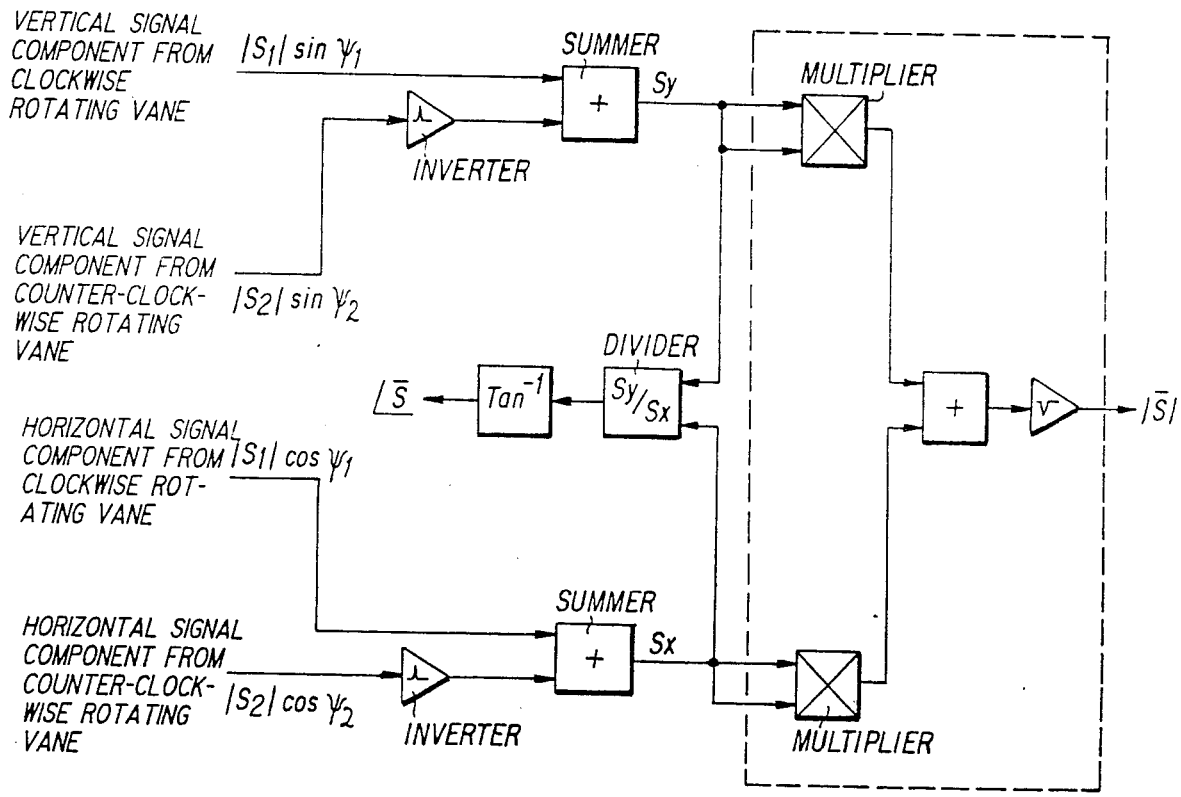

FIG. 20 is a schematic view of the circuit employed in processing the signals from two counter rotating Magnus vane assemblies.

BEST MODE FOR CARRYING OUT THE INVENTION

Referring now to the embodiment of FIG. 5, 20 designates a foundation which may be gyroscopically stabilized upon which is secured a base mount 21. A support column 22 supports a universal pivot or gimbals 23 through which passes a sensing column 24 which houses a light channel 25 conducting light from a light source 26 embodied within the sensing column 24 over which is mounted the Magnus vane 27 having an external right circular symmetrical shape with a closed top 28 and a rounded bottom 29. Within the vane 27, mounted on the top of the sensing column 24 is a vane drive motor 30 which may be either of the A.C. or D.C. type but preferably is an A.C. synchronous motor which drives shaft 31 connected to spider arms or yokes 32 which are connected to the interior of the cylinder or vane 27 to impart rotation thereto.

Within the support column 22, the light channel 25 is concentrically mounted and at its lowermost end has a focusing lens 33 which concentrates the light from the source 26 coming from the vane 27, down the channel 25 to a plate holder upon which may be mounted either a photoelectric ring or an optical potentiometer.

Taut wires 35 and strain gauges 35A connect the sensing column to plate holder 36.

The universally mounted pivot 23 may be pneumatically damped.

Referring now to FIG. 6, an embodiment is shown wherein the Magnus vane is a cylinder 27A having a sphere 37B supported on shaft 37 journalled in the cylinder top at 38a, 38b. The sphere is rotated by an internally mounted D.C. motor 39.

The cylinder 27A is supported and secured by brackets or spiders 40 which are driven by the output shaft 41 of an A.C. synchronous motor 30A.

The support column 22A is mechanically coupled to the base mount 21A by a universal pivot 23A which may be pneumatically damped.

The light channel 25A channeling light from the light source 26A has a focusing lens 33A for concentrating light upon either an optical potentiometer or a photoelectric ring 34A as shown in FIGS. 8, 10 and 11.

Referring now to FIGS. 16 through 19, the Magnus vane 27B is connected by support bracket 32B to the drive output shaft 31B of the A.C. synchronous motor 30B which is mounted on sensing column 24 having a universal pivot 23 pneumatically damped in the manner shown in FIG. 5 as to its lower portion.

As shown in FIGS. 18 and 8 the segments 42 of the photoelectric ring 43 are alternately connected in parallel to two measuring circuits 44a and 44b, each of which contain CdS photocells 45, an IC 46 and an ammeter 47.

The material from which the cylinder (and sphere, if used) are built should be corrosion resistant for operation in damp (and salty) conditions, and should preferably be of low density. It would be advisable to choose a material capable of good heat condition, so that in wintry conditions, heating elements in contact with the inner cylinder wall could be activated to prevent icing. The probability of rapid icing might not be great, however, since we expect the rotation of the cylinder (anywhere from 1000 RPM–3000 RPM) to be a deterrent to such formation. This should be invariably true, since the centrifugal force developed at the angular speeds contemplated would exceed the surface tension of surface droplets sufficiently large to be of any significance. The heating elements would also prove invaluable in high humidity non-freezing conditions, since they could be used to prevent condensation on the outer surface by maintaining the surface temperature in excess of the dewpoint temperature. The outer surface of a rotating component should be smooth (preferably polished) and free from any attachments or indentations which would interfere with the generation of a regular, symmetrical circulatory flow around it. Such a low density, regular, hydrophobic surface with an acceptable thermal conductivity coefficient might be realized from polished aluminum. Rainfall should not, therefore, be an impediment to this system's operation.

As has already been shown, the effects of drag on the cylinder will introduce spurious vector information beyond that contributed by the Magnus force. This may be significant if the relative wind velocity (with respect to the platform on which the sensor is mounted) is very great. In addition, platform motion is a factor to consider as it is a potential source of noise. Although measurements will normally be made within an operational circumstance that is truly stochastic, the peculiar attributes of the proposed system are such as to render the system truly deterministic.

If a second and similar wind velocity sensor were mounted close to the first—but outside the wake created by the first—and if the cylinder of this second sensor were to be rotated at the same angular velocity in a sense opposite to that of the first, then from the theory and derivations already presented, its Magnus vector would be equal and opposite to that of the first. But the drag it experiences and the noise incorporated from the motion of the platform would be the same as for the first: hence, subtracting the signal of the second sensor from that of the first would remove the effects of drag and noise while doubling the value of the Magnus vector. FIG. 7 shows the vector interaction resulting in a "reduced to deterministic" system. A further engineering expedient, such as the precise government of the damped response of the universal pivot, could conceivably go some way towards mitigating the effects of certain transient noises caused by vibration and platform motion. A response time of 1/20 sec, for example, would remove transient responses of shorter duration while sensibly allowing as many as 20 independent updates of the wind vector (i.e., both magnitude and direction) to be made each second.

In measuring the speed and direction of the fluid stream, the sensing cylinder would not be allowed unlimited turn in response to the Magnus force acting upon it. Some tilt would be allowed in order to determine the direction of the impinging fluid stream (tilt tolerance); but an accentuated motion away from the vertical would introduce complicating trigonometric factors in the scaling process. The near vertical orientation of the vertically mounted cylinder would be assured by the application of a restoring couple—once the tilt tolerance has been exceeded by virtue of the wind speed. This restoring couple could be arranged in various ways. Some probable arrangements are itemized below:

(i) The spring constant of the pneumatically damped universal pivot (if one is used in preference to a mechanical diaphragm) could be increased or decreased accordingly by varying the pressure of the damping fluid. This would, of course, entail the use of an external compressor, leak valves, airtight seals and a simple feedback controller.

(ii) The motion of the cylinder outside its tilt tolerance away from the vertical could be physically restrained by employing a cylindrically shaped pressure plate. This would act as a barrier against further motion while measuring the increase or decrease in the tendency to move away from the vertical, thereby indicating the Magnus force.

(iii) The periphery of the lower extremity of the sensing column could be electrically equipped so as to devise an electromagnet which presents an outward pole of variable pole strength. This would be closely enclosed within a similar electromagnet fixed to the ring plate holder which presents the same outward pole as the first electromagnet; and has the same capability of variable pole strength. As the cylinder moves outside its tilt tolerance, the magnitude field strength for both electromagnets would be increased thereby increasing the magnetic repulsive force. A restoring couple could thus be realized which is responsive to the intensity of the Magnus force experienced by the cylinder. In this case, the monitored current which generates the magnetic fields would be a measure of the magnitude of the Magnus force. This arrangement would require a simple feedback controller; but might prove to be an intricate design problem.

The arrangement which would be the simplest in many respects would depend on four equal taut wires strung from the base of the sensing column and attached to positions on the ring plate holder directly below (FIG. 5). As the cylinder is acted upon by the Magnus force, each of the four wires will experience a tensile stress commensurate with the magnitude of the force. If the wires are equally spaced around the outer reaches of the sensing column, then a measure of their combined tensions will indicate the magnitude of the Magnus force, thereby determining the wind speed. A method remains to be decided on for measuring the tension in each wire. This could be done either by mechanically measuring the force each wire exerts on its base support (using strain gauges) or by monitoring the change in the conductivity of each wire. Care should be taken to ensure that the design safety factor is such that at very high wind speeds no extension in any of the wires would exceed that wire's elastic property in accordance with Hooke's Law.

In making measurements of wind speed and direction using the Magnus effect, the instrumentation which senses the tilt of the spinning vane must be so designed that the desired directional information is received without the vane moving too far out of its vertical plane. Two methods have been considered for measuring this allowable tilt: the first uses the high resolution photoelectric "ring" of FIG. 8; and the second employs the optical potentiometer of FIG. 9. Both methods will be briefly described.

The high resolution photoelectric ring is so designed that each photoelectric element in the ring structure has a unique directional address; and when adjacent elements are simultaneously partially illuminated, an interpolated hybrid address can be determined as a function of the relative electrical response of each such activated element. It is clear from FIG. 8 that the resolution of this direction finding device is enhanced by increasing the number of elements in the photoelectric ring, and by ensuring a sharply focusing optical arrangement in the light channel.

In the general case, the partially illuminated elements are the i th and (i+1) th elements with electrical responses I and aI respectively (NB:a>0). The i th element has the directional address $2\pi i/n$ (radian measure) wheren n is the number of elements around the ring; and the system is so adjusted that the diameter of the focussed beam at the sensor plane is equal to the effective width of the excitable photoelectric element of that plane (FIG. 10a). An expression for determining the interpolated hybrid address when adjacent elements are partially illuminated (FIG. 10b) is derived below.

The electrical responses from both adjacent cells will depend on the division of the lighted areas between the cells. This in turn will be reflected in the square of the currents induced in both cells. FIGS. 11a and 11b show the likely division in the illuminated areas of adjacent cells, where the illuminated area of the (i+1) th cell is b times the illuminated area of the i th cell. Hence, if the currents from the (i+1) th and the i th cells are $I_{i+1}$ and $I_i$ respectively, then:

$$\left[\frac{I_{i+1}}{I_i}\right]^2 = b \tag{3.1}$$

Note also that the distance q is a measure of the "depth" of illumination of the i th cell measured along the diameter bisecting the common cell boundary. For the condition which obtains in FIG. 10a, q=0.

Taking FIG. 11c, the illuminated area of the i th cell is:

$$\alpha a^2 - (a - q)(\sqrt{q(2a - q)}) \tag{3.2}$$

where $\alpha$ is expressed in radians and is given by:

$$\alpha = \cos^{-1}\left(\frac{a - q}{a}\right) \tag{3.3}$$

FIG. 11b yields identical expressions for $\alpha$ and the area of the i th cell: note, however, that q and $\alpha$ must be consistently defined. Thus, the illuminated areas of cells i and i+1 are in the ratio of:

$$a^2\left\{\cos^{-1}\left(\frac{a-q}{a}\right)\right\} - \tag{3.4}$$

$$(a - q)(\sqrt{q(2a - q)}):a^2\left\{\cos^{-1}\left(\frac{q-a}{a}\right)\right\} +$$

$$(a - q)(\sqrt{q(2a - q)})$$

which from the definition above is the ratio:

$$1:b \tag{3.5}$$

The ratios given in (3.4) and (3.5) can be combined to produce the equation in (3.6).

$$b\cos^{-1}(1 - q/a) - b(1 - q/a)(\sqrt{q/a(2 - q/a)}) = \tag{3.6}$$

$$\cos^{-1}(q/a - 1) + (1 - q/a)(\sqrt{q/a(2 - q/a)})$$

If we write q/a=Q; and if we note that $\cos^{-1}(q/a-1)=\pi-\cos^{-1}(1-q/a)$, then equation (3.6) can be written as:

$$\cos^{-1}(1-Q)-(1-Q)[Q(2-Q)]^{\frac{1}{2}}=\pi/(1+b) \tag{3.7}$$

It is clear from equation (3.7) that $$0 \leq Q \leq 2 \tag{3.8}$$

By making the substitution, $M = 1-Q$ $(-1 \leq M \leq 1)$ equation (3.7) becomes $$M(1-M^2)^{\frac{1}{2}}-\cos^{-1}M+K=0 \quad \text{(system equation)(3.9)}$$

where $$K=\pi/(1+b) \tag{3.10}$$

From equation (3.1) it is seen that b is determined by the current outputs from the i th and (i+1) th elements. Once the value for b has been determined, K is found from equation (3.10). Thus, for a particular wind setting, K has a specific value; and the corresponding value for M is found using equation (3.9).

Equation (3.9) can be solved in a variety of ways. An analytical Bessel function solution could be found, or the analog circuit in FIG. 12a in conjunction with certain search routines could be employed. Neither of these approaches, however, would be simple, and a third approach using a microprocessor and "look-up" table appears to be the most appropriate. The size of the look-up table would depend on the resolution required in the determination of the interpolated hybrid address. The advantage of the form given in equation (3.9) will be made clear below.

An examination of equation (3.9) and a review of the sketch of the function M vs K in FIG. 12b show that the function is odd when the M axis is transposed to $K = \pi/2$. The look-up table need contain, therefore, only the values of K (and their corresponding M values) ranging from $K=0$ to $K=\pi/2$. The corresponding M value for a value of K greater than $\pi/2$ can be determined from the look-up table by subtracting such a K value from $\pi$ and then finding the result's corresponding M value in the appropriate way—taking the negative value of the M value so determined as the correct value of M. The "appropriate" determination of M is made by finding the two values of K in the look-up table that are immediately greater than (K-above) and immediately less than (K-below) the measured K. M is then found by linearly interpolating between the two values of M corresponding to K-above and K-below. The logical statement below synthesizes the essence of determining M.

IF $K < \pi/2$ THEN $M = Ma + \frac{(Ka - K) \cdot (Mb - Ma)}{Ka - Kb}$

ELSE IF $K = \pi/2$ THEN $M = 0$ ELSE

BEGIN $K = \pi - K$; $M = \frac{(Ka - K) \cdot (Mb - Ma)}{Kb - Ka} - Ma$ END

In the above logical statement, Ka and Kb represent K-above and K-below respectively; and Ma and Mb are the values of M in the look-up table which correspond to Ka and Kb. The look-up table for a system giving better than $\frac{1}{2}°$ bearing resolution and which employs thirty-six (36) cells in the photoelectric ring is given in Table 1. Having found q, the displacement of the center of the focussed beam can be determined, thus giving the arc of displacement, and consequently the interpolated hybird address.

The optical potentiometer shown in FIG. 9 as an alternative to the photoelectric ring system, is based on the light responsive potentiometer principle outlined by J. R. Rochester in U.S. Pat. No. 3,223,846. In the arrangement schematically depicted in FIG. 9, two separate light responsive half-rings are used. The light responsive transducer is a composite of three very thin, but distinct layers of material which are closely bonded together. Each layer performs a different function: the first (or bottom) layer is a resistive material formed by chemical or vacuum deposition on the insulating base as shown in FIG. 13. The thickness of the deposition is regulated to produce a specific resistivity. The second (or intervening) layer is a thin photoconductive material such as lead or cadmium sulphide or selenide, antimony trioxide, anthracene, zinc oxide or selenium. This second layer may be deposited by any of the techniques mentioned before, or by the application of a suitable paint-like composition comprising the powdered or sintered material suspended in an appropriate binder. The third (or top) layer is a highly conductive material which is applied sufficiently thinly so as to be translucent. This third layer serves as an electrode and acts as the variable arm of the potentiometer. FIG. 14 is the electrical analog of FIG. 9. As is clear from FIGS. 9 and 14, the reference arm of the potentiometer is found by making electrical connections to the extremities of the first layer. Thus, the position of the focussed light beam at any point on either of the half-rings will be determined by the ratio of the voltage at the top layer to the voltage across the bottom layer. By this expedient, the bearing of the wind can be found. The circuit shown in FIG. 15 is proposed for the actual implementation. The switch in position B gives the reference voltage across the bottom layer, whereas in position T the bearing voltage at the top layer is measured. The circuit is so designed that the polarity of $V_s$ is not crucial; and fluctuations in the value of this reference EMF are not unduly disturbing.

TABLE 1

| M | K | M | K |
|---|---|---|---|
| 0.00 | 1.5708 | 0.625 | 0.4078 |
| 0.05 | 1.4708 | 0.650 | 0.3693 |
| 0.10 | 1.3711 | 0.675 | 0.3318 |
| 0.15 | 1.2719 | 0.700 | 0.2955 |
| 0.20 | 1.1735 | 0.725 | 0.2604 |
| 0.25 | 1.0761 | 0.750 | 0.2267 |
| 0.30 | 0.9799 | 0.775 | 0.1943 |
| 0.35 | 0.8854 | 0.800 | 0.1635 |
| 0.40 | 0.7927 | 0.825 | 0.1344 |
| 0.425 | 0.7471 | 0.850 | 0.1070 |
| 0.450 | 0.7022 | 0.875 | 0.0818 |
| 0.475 | 0.6578 | 0.900 | 0.0587 |
| 0.500 | 0.6142 | 0.920 | 0.0422 |
| 0.525 | 0.5713 | 0.940 | 0.0275 |
| 0.550 | 0.5291 | 0.960 | 0.0150 |
| 0.575 | 0.4878 | 0.980 | 0.0053 |
| 0.600 | 0.4473 | 1.000 | 0.0 |

NB: $K = \pi/(1 + b)$ and $q = a(1 - M)$

In FIG. 5, the base of the cylinder 27 is rounded with a radius of curvature equal to two thirds that of the radius of cylinder. The pneumatically damped pivot (or mechanical diaphram) is raised closer to the cylinder base thereby reducing the magnitude of the force needed to effect the restoring couple. In addition, both the top and the bottom of the cylinder are closed to prevent spurious wind effects inside the cylinder. A cylinder diameter of 2 inches and a length of $2\frac{3}{8}$ inches are proposed. The distance from the center of the pivot to the lower extremity of the sensing column is also $2\frac{3}{8}$ inches; and the total length from the top of the cylinder to the bottom of the stabilized foundation is about seven (7) inches.

The schematic diagram of FIG. 20 shows how the signals ($\bar{S}_1$ and $\bar{S}_2$) from two counter rotating vanes are combined to eliminate the effects of drag and platform motion on each vane. A consequence of this deterministic reduction is a doubling of the magnus vector. The readout of the values $|\bar{S}|$ and $\angle \bar{S}$ can be made via an LED (or a liquid crystal) display.

Referring now to FIGS. 9, 14 and 15, FIG. 14 is the electrical analogue of FIG. 9. By this is meant that the parallel arrangement of resistance wires across the source $V_s$ in FIG. 14 represents the upper and lower halves of the resistive layers in the optical potentiometer of FIG. 9. Also, the slide-wire representations of FIG. 14 emulate the combined performances of the focussed light beam, the photoconductive layer and the electrode element of FIG. 9.

This latter observation can be explained by noting that the point on the photoconductive layer at which the light beam is focussed becomes conducting, while the rest of the photoconductive layer retains its insulating characteristics. The entire electrode element therefore attains the partial potential value commensurate with the potential drop across the portion of the resistive layer spanned between the point at which the light beam is focussed and the common terminal with the measuring voltmeter.

The focussed light beam therefore emulates a frictionless sliding contact across the expanse of the optical potentiometer's resistive layer. The ratio of the voltage (V) so obtained across the "slide-wire" circuit to the source emf ($V_s$) will determine the position along the optical potentiometer at which the light beam is focussed (FIG. 14).

In FIG. 15, the introduction of the diode pairs $D_1$–$D_2$ and $D_1'$–$D_2'$ enable the required measurements (V and $V_s$) to be made using only a single voltage measuring device via the double pole switch B-T. In this way, the system is only subject to the vagaries of a single device when both measurements are taken. Recalibration can, therefore, be done more expeditiously and more confidently.

Two diodes are effectively assigned to each half of the optical potentiometer, thus rendering the precise orientation of the polarity of the source $V_s$ irrelevant. As shown in FIG. 15, diode $D_2$ would conduct if the light beam were focussed on the upper half of the optical potentiometer; and $D_2'$ would conduct if the beam were focussed on the lower half. If the polarities of the source $V_s$ were reversed, the diodes $D_1$ and $D_1'$, respectively, would conduct from the upper and lower halves.

The apparatus and method as herein disclosed may be employed to detect spatial wind shear and may be installed on an aircraft or ship as well as upon land, encompassing glide paths or glide slope indication of airport runways.

As employed in the foregoing description the magnitude of the wind vector is understood to be a precise determination of the wind speed.

3.2 DETERMINING OPERATIONAL CONSTRAINTS

From theory, the expected lift due to the Magnus effect may be expressed in vector form thus:

$$\vec{L} = \rho(\vec{U} \times \vec{\Gamma})$$

where $L = |\vec{L}|$; and $\Gamma$ is the modulus of the axial vector given by (Karamcheti, 1966)

$$\Gamma = \oint_{\text{PATH 1}} \vec{V} \cdot \vec{dl}$$

In the case of the cylinder spinning about its axis, the velocity of the circulatory flow $\vec{V}$ is always in the same direction as the elemental streamline path $\vec{\delta l}$. Hence, $$\Gamma = \oint_{\text{CIRCLE}} \vec{V} \cdot \vec{dl} \rightarrow a\omega \cdot 2\pi a$$

and the inequality constraints of $0 < \Gamma \leq 4$ Ua now become $0 < 2\pi a^2 \omega \leq 4\pi Ua$ which result in the following:

(i) $\omega > 0$ (ii) $U \geq \frac{1}{2} a\omega$.

The above suggest that the required rotation is governed by the lower threshold of fluid velocity for which reliable measurements are desired. A wind speed of 5 mph, for example, would resolve as follows:

5 mph = 7.33 ft/sec

Therefore, $a\omega \leq 14.67$ ft/sec

For a 2" diameter cylinder $\omega \leq 176$ radians/sec and the corresponding rotation (f) gives $F \leq 1681$ rev/min Since the equation $L = \rho U \Gamma$ must also be considered, we should operate close to the above rotation rate of 1681 RPM—say 1620 RPM. It should be noted that for higher wind velocities, the above RPM value still satisfies the inequality constraint $U \geq \frac{1}{2} a\omega$.

What I claim is:

1. A Magnus vane type wind velocity and direction determination apparatus comprising
    a first Magnus vane having an external right circular symmetrical shape mounted on a support column with its major axis vertical and rotatable about said vertical axis and supported by a base mount,
    an electric motor carried by said support column and being connected through a motor drive shaft to rotate said Magnus vane about its vertical axis,
    a universal pivot connected between said support column and base mount pivotally supporting said column and Magnus vane above said base mount,
    and electromagnetic energy transmitting and receiving means, said electromagnetic transmitting means being supported proximate the top of said support column and said electromagnetic energy receiving means being carried by said base mount.

2. The apparatus of claim 1 further comprising a light channel tube means concentrically within said support column and light focusing lens means carried by said light channel tube means proximate said electromagnetic energy receiving means.

3. The apparatus of claim 2 further comprising a sphere mounted for horizontal rotation within said Magnus vane.

4. The apparatus of claim 3 wherein said sphere rotates with a motor driven shaft journaled in the Magnus vane top.

5. The apparatus of claim 1 wherein the electromagnetic receiving means is an optically scannable segmented ring positioned to receive the energy from said electromagnetic energy transmitting means.

6. The apparatus of claim 5 further comprising a gyoscopically stabilized foundation upon which said base mount is supported.

7. The apparatus of claim 1 wherein said electric motor is an a.c. synchronous motor.

8. The apparatus of claim 1 wherein the universal pivot is pneumatically damped.

9. The apparatus of claim 1 wherein the universal pivot is a mechanical diaphragm.

10. The apparatus of claim 1 wherein the electromagnetic energy transmitting and receiving means are photoelectric transmitters and receivers within the visible spectrum.

11. The apparatus of claim 10 wherein said receivers are an optical potentiometer.

12. An apparatus as claimed in claim 10 further comprising
a second Magnus vane identically constructed and driven as said first Magnus vane positioned outside the wake created by the first Magnus vane and being rotated at the same angular velocity but in a direction opposite to that of the first producing a second Magnus vector equal and opposite to that of the first Magnus vane so that subtracting the signal of the second Magnus vector from the first Magnus vector removes drag and noise effects on each while doubling the value of the Magnus vector.

13. A Magnus vane type wind velocity and direction determination apparatus comprising
a Magnus vane cylinder mounted on a vertically positioned column with its major axis vertical and being rotatable about said vertical axis,
an a.c. synchronous motor carried by said column and having an output shaft connected to rotate said Magnus vane cylinder about its vertical axis,
a pneumatically damped universal pivot supporting said column on a stabilized base mount,
and photoelectric beam transmitting and receiving means comprising a ring like array of photoelectric detection means carried by said stabilized base mount and positioned thereon to detect and receive and indicate sweep of the photoelectric beam transmitted down said column to said receiving means to indicate rate changes in wind velocity and direction.

14. The apparatus of claim 13 further comprising light channel tube means mounted concentrically within said column and light focusing lens means carried by said light channel tube means proximate the photoelectric detection means.

15. The apparatus of claim 13 wherein said Magnus vane has a cylindrical main body portion having a substantially closed end and a closed top.

16. A Magnus vane type wind velocity and directional determination method comprising
mounting a Magnus vane having an external right circular symmetrical shape on a support column for rotation about its major axis, providing a universal support between said support column and a base mount, imparting rotation to said Magnus vane abouts its major axis, and transmitting and receiving electromagnetic energy from within the visible and near visible spectrums between the top of said support column and said base mount along the major axis of said vane.

* * * * *